Inventors:
Edward D. McCormick,
Hubert K. Burke,
Frederick A. Hottes,
by Paul A. Frank
Their Attorney.

COMMUNICATION RESPONSE UNIT

Filed Nov. 27, 1968 5 Sheets-Sheet 2

Inventors:
Edward D. McCormick,
Hubert K. Burke,
Frederick A. Hottes,
by Paul A. Frank
Their Attorney.

Inventors:
Edward D. McCormick,
Hubert K. Burke,
Frederick A. Hottes,
by
Their Attorney.

Inventors:
Edward D. McCormick,
Hubert K. Burke,
Frederick A. Hottes,
by Paul A. Frank
Their Attorney.

COMMUNICATION RESPONSE UNIT

Filed Nov. 27, 1968 5 Sheets-Sheet 5

Inventors:
Edward D. McCormick,
Hubert K. Burke,
Frederick A. Hottes,
by Paul A. Frank
Their Attorney.

United States Patent Office 3,541,257
Patented Nov. 17, 1970

3,541,257

COMMUNICATION RESPONSE UNIT

Edward D. McCormick and Hubert K. Burke, Schenectady, N.Y., and Frederick A. Hottes, Grand Junction, Colo., assignors to General Electric Company, a corporation of New York Filed Nov. 27, 1968, Ser. No. 779,488
Int. Cl. H041 9/00
U.S. Cl. 178—22 13 Claims

ABSTRACT OF THE DISCLOSURE

A communication response unit employable in CATV networks and the like contains an array of logic circuitry comprising in part an address coincident circuit and a command function decode circuit. The address coincident circuit is operable only when a received signal contains a uniquely coded address corresponding to the predetermined address electronically imprinted in the coincident circuit. The function decode circuit operates to decode a second received signal called a command function signal and places the communication response unit in a plurality of operating modes, each of which is determined by the particular command function signal received. In one mode, the communication response unit transmits data recorded therein into the network. A second mode of operation causes the responding unit to clear the storage registers of the data stored therein. In still another mode, the responding unit energizes an indicator to indicate that an error in transmission has occurred.

This invention relates to a communication response unit, and more particularly to a communication response unit capable of storing data and transmitting the stored data upon receipt of a properly coded signal.

Communication networks, such as community antenna television networks (CATV), telemetric networks, and educational networks which are well known in the prior art, ordinarily comprise a central station and a plurality of remote responding units. It is characteristic of such networks to have the central station transmit an interrogation signal to which the units respond by transmitting recorded data back to the central station. The recorded data may consist of, for example, a negative or affirmative response to a question proposed as part of a program in the case of the CATV network or recorded weather data in the case of the telemetric network.

It is becoming increasingly essential that the transmissions between the central station and the remote units be done in a short time duration. Many of the communications inherently require identification of the recorded data with the particular transmitting unit. The dichotomy between short time durations and identification requirements has presented a problem which the prior art has attempted to solve in a number of ways.

It has been atttempted to equip each unit with a cyclic timer. The responding units are then identified by the timing of the return data transmission. Another system utilizes an electromechanical selective decoder in cooperation with the responding unit. A series of pulses transmitted by the central station steps the arms of the decoder until the arms reach a position which energizes a transmitter. Each unit is provided with a decoder which energizes the unit transmitter after a particular number of pulses, Thus, each unit may be said to have an "address" and responds only to a signal containing that address.

Both of the above representative systems of the prior art are ineffective when the number of responding units increases beyond a certain point since the time interval needed to identify the units becomes excessively large.

It is also desirable that each responding unit be able to receive other signals from the central station and function in accordance with those signals. The capability of this added function is important in view of the electronic disturbances inherently present in communication networks. For example, electronic noise may render address recognition components in a responding unit ineffective, thus causing the circuit to miss its address signal. To reduce such an effect requires that the responding unit be set in a "normal state" immediately prior to the reception of the address signal.

Disturbances may also distort the transmitted data to a point where the central station is unable to understand the received transmission. It is important, therefore, that the operator of the responding unit be made aware of transmission errors through a signal from the central station indicating an error.

It is also important that the responding unit be cleared of the recorded data when it is properly received and that the unit operator be made aware that the recorded data has been received. This necessitates the responding unit function in accordance with another signal from the central station.

Accordingly, it is an object of the present invention to provide a communication response device which immediately responds to a correctly coded address signal.

It is another object of the present invention to provide a communication response device which is placed in a normal state immediately prior to receiving a coded address signal.

It is still another object of the present invention to provide a communication response which stores recorded data until a coded address signal is received.

It is yet another object of the present invention to provide a communication response device which clears the recorded data from the unit in response to a coded signal.

It is a further object of the present invention to provide a communication response device which indicates an error in recorded data transmission in response to a coded signal.

Briefly stated, in accord with our present invention, we provide a communication response unit device with a detector for receiving a modulated electromagnetic signal carrying a preliminary reset pulse and coded information. The response unit device of our present invention is placed in a normal state by the preliminary reset pulse. The coded information comprises an address portion and a command function portion, both portions being stored in the response unit device. An address coincident detector responsive only to the coded address portion when in a singular or unique pattern produces a signal output which permits the response unit device of our present invention to operate in accordance with the command function portion.

The foregoing and other objects, features, and advantages of our invention will be apparent from the following more particular description of several preferred embodiments and may best be understood by reference to the detailed description taken in connection with the accompanying drawings wherein:

FIG. 1 illustrates a flow chart showing the various signals and information contained therein transmitted between the central station and a particular communication response unit in one cycle of communication;

FIGS. 2*a*, 2*b*, 2*c*, and 2*d* illustrate respectively a square wave configuration of binary coded information, synchronizing clock impulses, a reset pulse, and a superimposition of all the square wave configurations;

A communication response unit device of our present invention may be utilized in a communication network such as the one described and claimed in application Ser. No. 779,568 of Edward D. McCormick, assigned to the same assignee as the present application and filed concurrently herewith. As stated therein, a series of communication flows through a suitable transmission medium between a central station and a plurality of remote communication response units (CRU). The central station initiates an operation cycle with one CRU by transmitting a signal carrying coded address information and command function information. Each CRU is electronically wired to respond only to address information arranged in a singular coded pattern. Thus, each CRU has a unique address and does not respond to a signal from the central station unless the coded address information is arranged in the proper pattern. When the proper address information is received, the unit responds in accordance with the command function information. It is important to note that all communications between a CRU and the central station contain the identifying coded address information.

Figure 1:
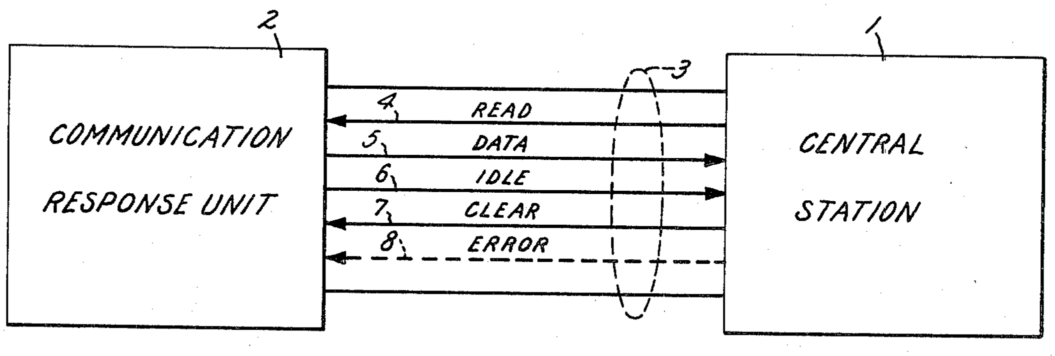

FIG. 1 illustrates via a flow chart the communications that may occur in one operating cycle between central station 1 and a single communication response unit 2. Central station 1 initiates the operation by transmitting to CRU 2 a signal 4 carrying the command function "read" and address information through a suitable transmission medium such as coaxial cable 3. Assuming the address message corresponds to the wired-in address, CRU 2 responds to the "read" command function by transmitting back along coaxial cable a signal 5 containing data and address. The data may be impressed in CRU 2 by the subscriber through a peripheral device as described later. When no data is impressed in CRU 2, a signal 6 comprising an "idle" message and address is transmitted to central station 1. In either case, central station 1 checks the incoming communications for errors. When no errors are found, central station 1 transmits signal 7 containing a "clear" command function along with the address. The clear command indicates to the CRU operator that the recorded data has been transmitted and received and also clears the unit of the data stored therein. Signal 6 containing the "idle" message requires no response from central station since the unit is devoid of stored data.

When, however, there is an error in the transmission of signal 5, or conversely when no signal 5 or signal 6 is transmitted, the central station retransmits signal 4 containing the command function "read." Should the result be the same, central station 1 then transmits a signal 8 containing the "error" command function, indicating to the operator that there is faulty comunication between central station 1 and CRU 2.

The above cycle is one of a sequence of cycles through which the central station operates. Central station 1 communicates to each of the plurality of CRUs in a predetermined order which may be based, for example, upon ascending numerical addresses. It is also important to note that central station 1 as described in application Ser. No. 779,568 does not transmit to the next CRU in the predetermined order until the present cycle is completed.

Figure 2:
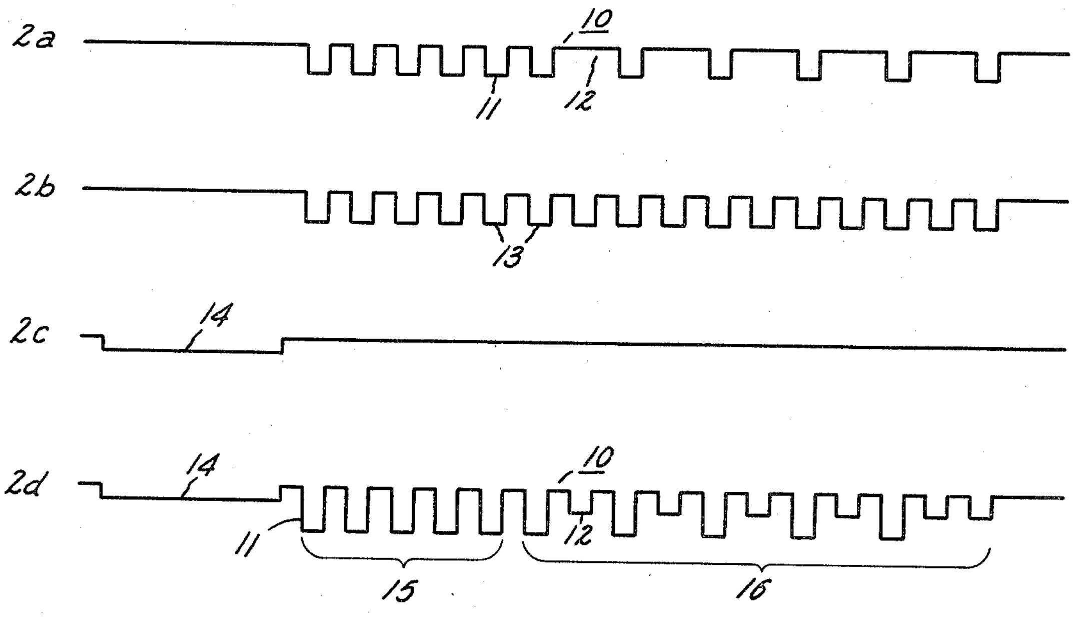

We have found it convenient to transmit information between the central station and the CRU in binary coded digital (BCD) form. It should be understood, however, that the CRU device of our invention is adaptable to other coded forms of information; thus, the following is for descriptive purposes only. FIG. 2*a* schematically represents a typical electrical representation of digital symbols. The amplitude level 11 of square wave 10 may represent a logic one while the amplitude level 12 may represent a logic zero.

FIG. 2*b* illustrates a square wave bearing synchronizing clock pulses 13. Clock pulses 13 are utilized to time-synchronize the various operating and memory elements in the CRU.

FIG. 2*c* shows a single pulse 14 which is used as a "reset" in the CRU. The reset pulse described in more detail hereinafter generally functions as a signal to clear registers employed to store the address and command-function information.

FIG. 2*d* illustrates the combination of the signals in FIGS. 2*a*, 2*b*, and 2*c* into a single BCD data signal. This signal called a three-level "return-to-zero" binary coded signal is the coded output of the central station. Logic one is still represented by amplitude level 11 and logic zero is represented by level 12. The binary "0" level may, for example, be less than the binary "1" level by about 20 percent while the reset pulse mav be less than the binary "1" level by about 50 percent.

For purposes of illustration and as defined herein, five binary symbols or "bits" comprise a single "character." In FIG. 2*d*, for example, portion 15 of square wave 10 is an electrical representation of a character containing five bits, 11111, which may be the command function "read." The other command functions, "clear" and "error", may be represented by bits 10101 and 11100, respectively. For ease of description, coded addresses are discussed as consisting of four characters or twenty bits. When the addresses of the various CRU's are numerical, a four-character address may go numerically from 0000 to 9999, thus encompassing 10,000 separate communication response units. It is understood, however, that the number of characters in the address may be increased when desired to facilitate a larger communication network.

The possible uses of the communication device of our present invention are varied. For example, it may be possible to employ these devices in educational or commercial subscriber television networks. In the commercial subscriber television network, a central transmitting station may display an advertised article along with its catalog number on the screen of the subscriber's television set. The subscriber desiring to purchase the article enters the catalog number into his response unit by appropriate peripheral means such as a keyboard. When the central station transmits the signal containing the command function "read," the CRU responds by transmitting the recorded data, herein the catalog number, and unit address, back to the central station. The information is processed, stored, and/or retransmitted to a remote merchandising center.

In a television communication network such as the above, the "forward" signal containing both video and digital signals moving from the central station to the television receivers and responding units may be transmitted in the VHF band (54 to 216 MHz). The reverse signal moving from the CRU to the central station may be transmitted in a band directly below the VHF band, or alternatively, in a 2 to 4 MHz bandwidth in the spectrum between channels 13 and 43. The full VHF band has a capacity for approximately 22 TV channels plus the FM band.

The bandwidth, however, for data channels is governed by the data rate and modulation method. A 2 MHz bandwidth is needed for a bit rate of 1 MHz using double-side band amplitude modulation. Thus it is possible to interrogate CRUs at a high rate of speed which approach 10,000 units in 1.0 second for a bit generation of 1 MHz. We have found that a 2–4 MHz bandwidth with signal carriers of 140.5 MHz and 20 MHz, respectively, are sufficient for the forward and reverse digital channels.

Figure 3:
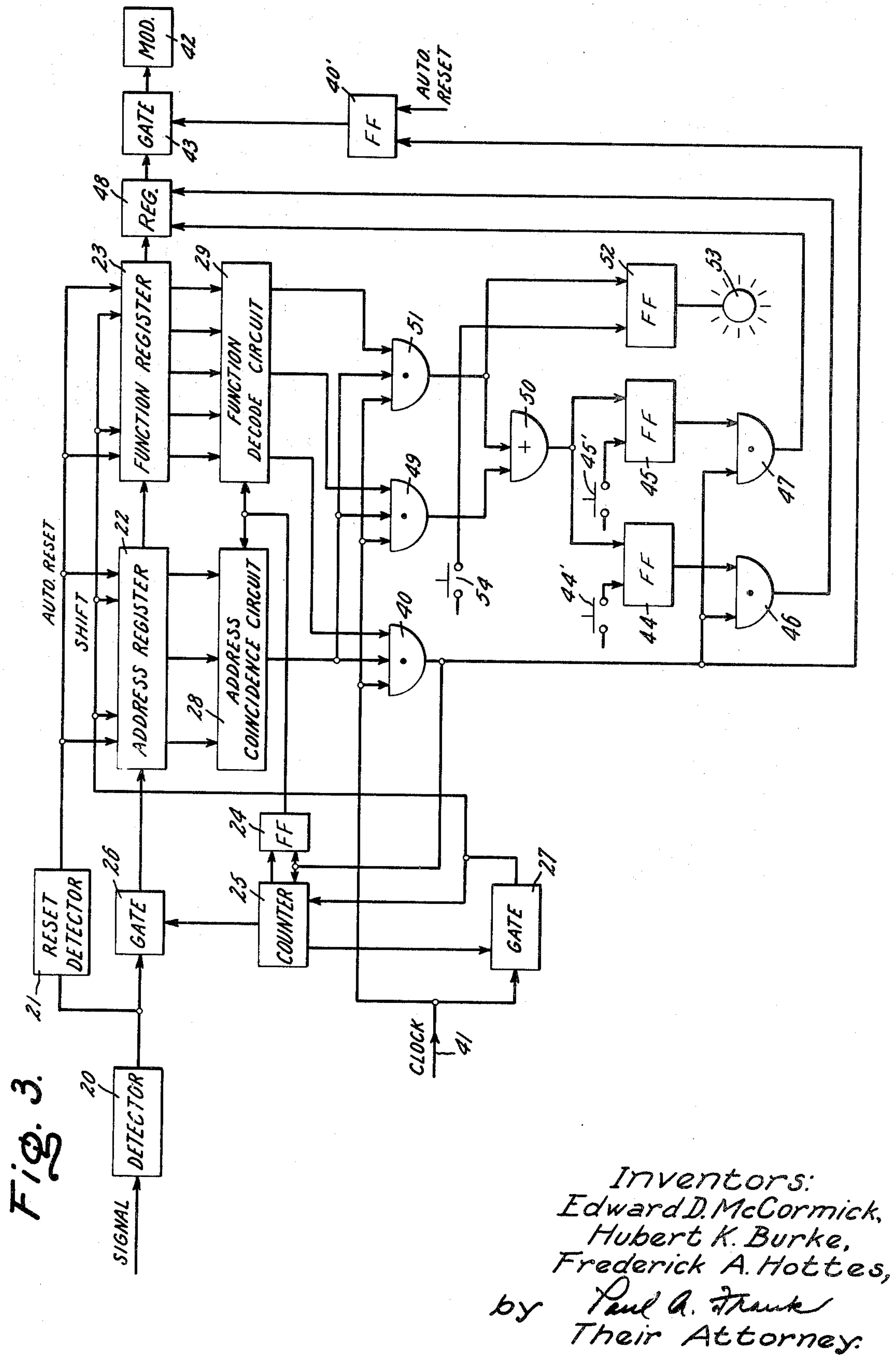
FIG. 3 is a schematic diagram of the operating elements of one embodiment of a communication response unit device of our invention.

FIG. 3 illustrates the various operative elements of one embodiment of our present invention. Signal detector 20 senses the presence of a modulated carrier wave transmitted by the central station. An initial or preliminary pulse in the carrier wave called the reset pulse places the CRU in a "normal" state immediately prior to receiving the modulated carrier wave containing data. The normalization is accomplished by reset detector 21 which automatically resets 20 bit address register 22, 5 bit function register 23, bistable multivibrator or flip-flop circuit 24, counter 25, and flip-flop circuit 40'. Reset detector 21 may be, for example, an integrator and level detector which responds to the reset pulse level by generating the automatic reset signal. Resetting counter 25 opens gates 26 and 27 simultaneously allowing the coded signals such as, for example, a three-level, return-to-zero binary coded signal to enter the CRU logic and control circuits.

Figure 4:
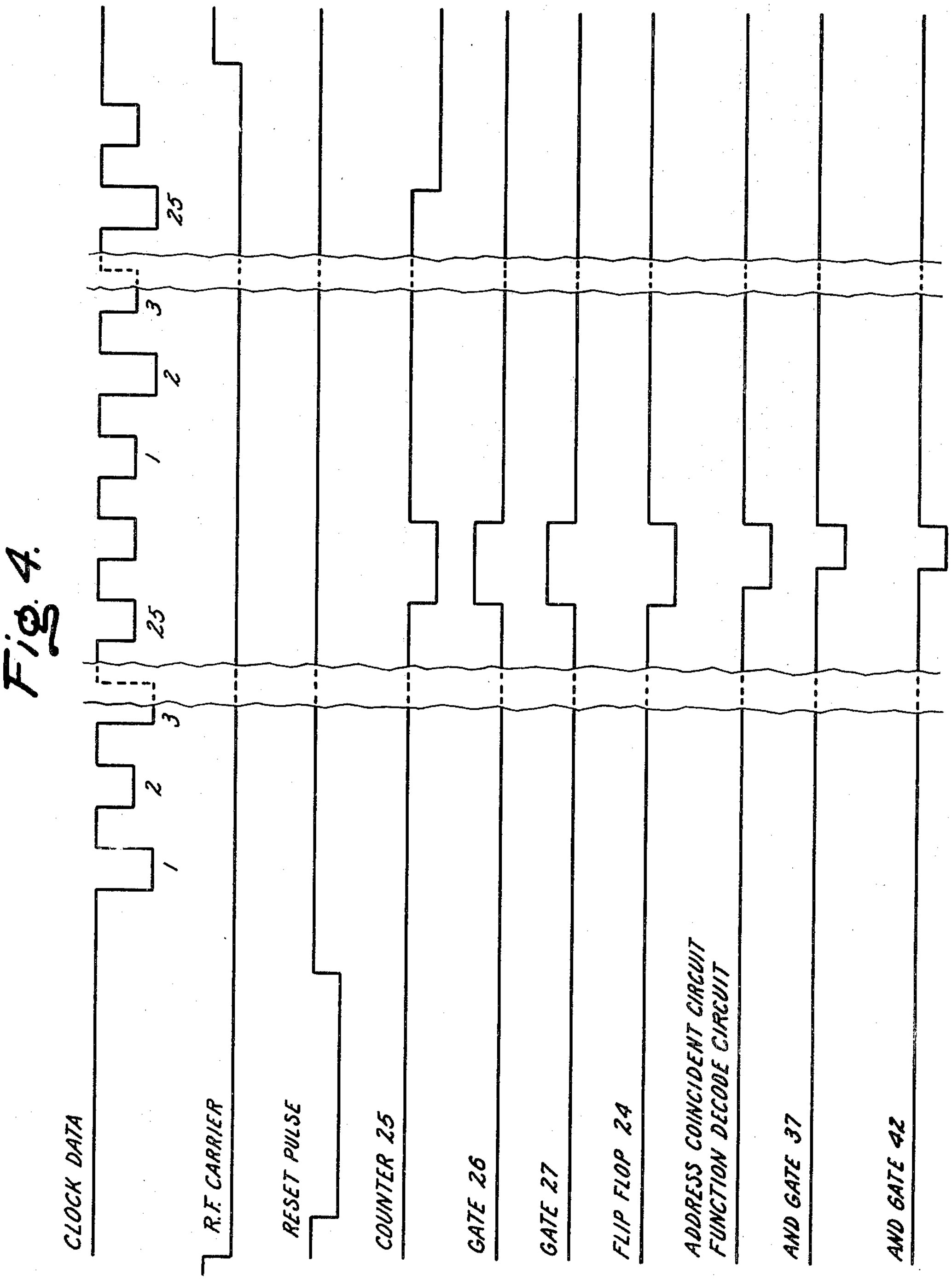
FIG. 4 is a diagram showing the time relationship between some of the elements seen in FIG. 3.

FIG. 4 illustrates that the clock signal and the signal containing the coded information do not start immediately with the carrier wave. For brevity, FIG. 4 is broken to omit the unnecessary repetitions of clock and data amplitude levels. The reset pulse which may last for 3 to 5 $\mu$sec. occurs after the carrier is turned on but preliminary to each central station transmission. The first clock pulse may occur 0.5 $\mu$sec. after the reset pulse. Each clock pulse is illustrated as a 1 MHz square wave.

As shown in FIG. 3, the data first enters into address register 22. After 20 bits are entered, the bits begin entering function register 23. Thus, the first five bits ordinarily represent the function command. After 25 bits and/or clock pulses, registers 22 and 23 are filled. Counter 25 is a "divide-by-twenty-five" counter which may comprise a series of cascaded flip-flops appropriately interconnected. Counter 25 changes state after registers 22 and 23 are filled, placing flip-flop 24 into a set state, closing gates 26 and 27, and sending a pulse via flip-flop 24 to both address coincidence circuit 28 and function decode circuit 29. The timing diagram of FIG. 4 illustrates the change of state of counter 25 in correlation with the closing of gates 26 and 27 and setting of flip-flop 24.

Figure 5:
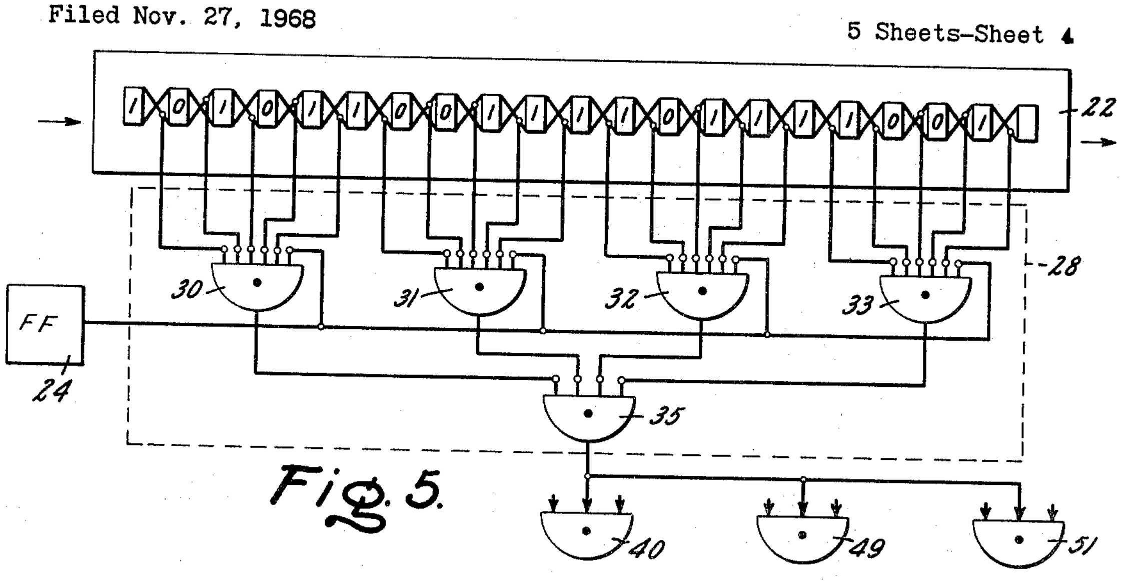
FIG. 5 is a schematic diagram of the address coincidence circuit shown in block form in FIG. 3.

FIG. 5 is an illustration of a typical address decode circuit. The address register 22 is shown as 20 flip-flops connected as a shift register. The flip-flops are divided into groups of five with each group storing a character. The groups are wired to AND gates 30, 31, 32, and 33. Only the outputs desired, however, are so connected. Thus, AND gate 30, for example, opens only when the first group of flip-flops is filled with bits arranged in a 10101 pattern. AND gate 30 further needs the strobing pulse from divide-by-twenty-five counter 25 and flip-flop 24 to open. All four AND gates 30 through 33 are further connected to a single four-input AND gate 35. Therefore, AND gate 35 opens only when there is complete coincidence between the coded address information and the wired-in address of address coincidence circuit.

Figures 6, 7:
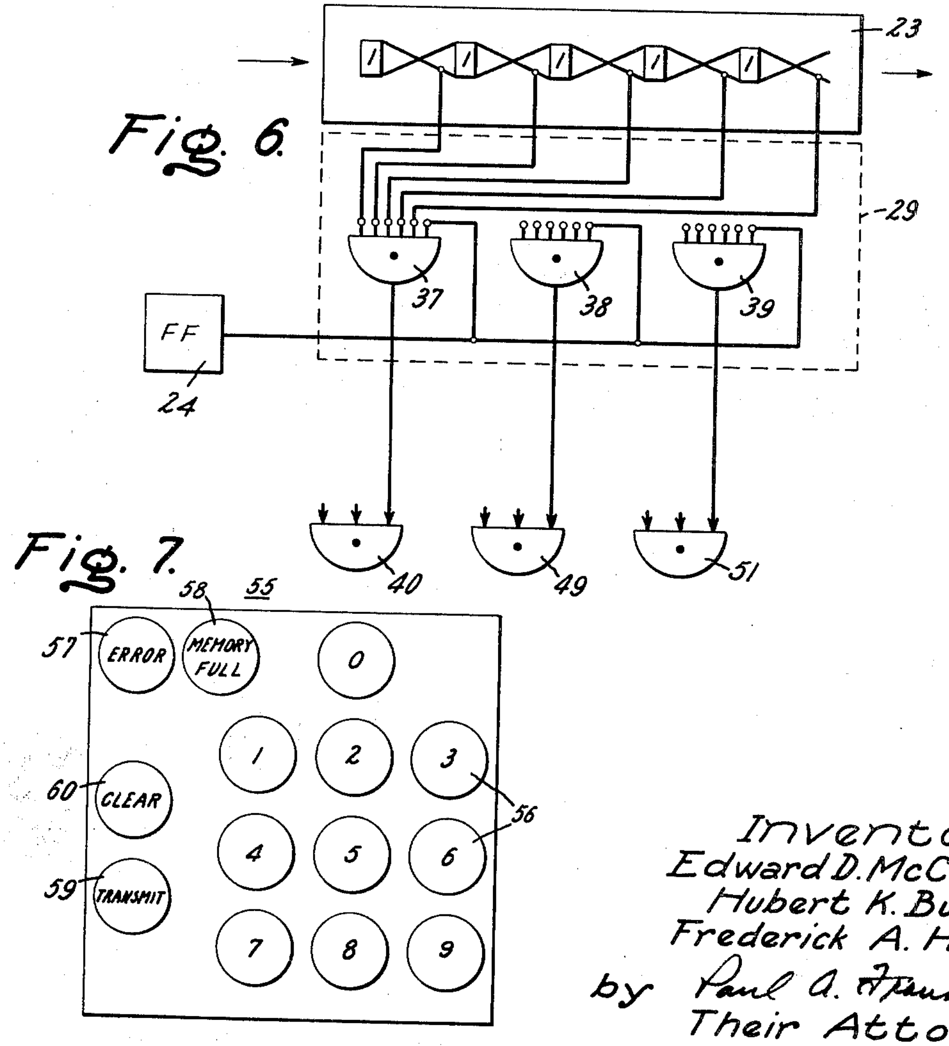
FIG. 6 is a schematic diagram of the function decoder circuit shown in block form in FIG. 3.
FIG. 7 is an illustration of the exterior face of a keyboard device utilized in cooperation with a second embodiment of a communication response unit device of our present invention.

FIG. 6 is an example of a typical function decode circuit. For brevity, the circuit is shown for decoding only the "read" command function. The circuit described, for example, may use three AND gates such as gates 37 to 39, all of which receive inputs from the three flip-flops comprising the function register 23. Only the outputs of the flip-flops corresponding to the bit pattern desired are connected to AND gates 37 to 39. Thus, in the example shown, only the high or binary one outputs of the function register 23 are connected to AND gate 37.

The binary code 11111 represents the read function. The other AND gates 38 and 39 for "clear" and "error" command functions are similarly connected to proper outputs of the flip-flops of the function register 23. As previously discussed in connection with the address coincidence circuit, the strobing pulse of divide-by-twenty-five counter 21 through flip-flop 24 is also necessary for AND gates 37 to 39 to open.

The diagram of FIG. 4 illustrates the time sequence in which circuits 28 and 29 enter into AND gate 40 along with a clock pulse from the clocking signal indicated by line 41. This occurs only when there has been both the address coincidence and a read function decode. As seen in FIG. 3, the output from open AND gate 40 resets flip-flop 24 and counter 25. The output from counter 25 opens gates 26 and 27 allowing clock pulses to re-enter the unit and shift the address and function information in registers 22 and 23 to modulator 42 for transmission. Because flip-flop 24 has been reset, circuits 28 and 29 are not affected by the shift.

The output from AND gate 40 alo sets flip-flop 40' which in turn opens gate 43. The signal outputs of flip-flops 44 and 45 when in the set and reset positions, respectively, supply signal outputs which may represent a positive response such as digital "10" to the "read" command function. Conversely, flip-flops 44 and 45 when in the reset and set positions respectively supply signal outputs which may represent a negative response such as digital "01." It is important to note that the manually operated switches 44' and 45' place flip-flops 44 and 45 in their respective set positions. AND gates 46 and 47 receiving an input from AND gate 40 and also inputs from flip-flops 44 and 45 respectively supply inputs into two bit register 48. When both flip-flops 44 and 45 are in the reset position, the elements of register 48 receive and store signals which may represent the "idle" response 00, thus indicating that no data has been entered into the CRU. Clock pulses from the external signal move the response stored in register 48 out through gate 43 to modulator 42 for transmission back to the central station.

When, however, a signal containing a "clear" command function is received and there is address coincidence, AND gate 49 in FIG. 3 receives simultaneous inputs from circuit 28, circuit 29, and clock signal 41 and generates a corresponding output which resets via OR gate 50 either flip-flop 44 or flip-flop 45. By resetting flip-flop 44 or 45, the central station has indicated to the operator that the recorded data (herein the positive or negative response) has been received.

The signal containing the "error" command function also causes AND gate 51 to provide an output, via OR gate 50, which resets flip-flop 44 or flip-flop 45 and sets flip-flop 52. The output of flip-flop 52 may be used to energize error indicator 53, thus visually indicating an erroneous transmission. Flip-flop 52 as illustrated may be reset through a manual means only, such as switch 54.

Instead of a simple positive, negative, or idle response, it may be desirable to communicate a more complex message to the central station. The communication response device of our invention may be easily adapted to receive and store complex information from a peripheral device such as a remote transmitter or even a keyboard device such as illustrated in FIG. 7. Keyboard device 55 is depicted as having keys 56 inscribed with characters such as numbers on the face of each key. Each key 56 when depressed may initiate an encoding cycle wherein bits representing the inscribed numerals may be generated. For purposes of illustration, the number of bits generated when a key is depressed is discussed as five. The error indicator 57 is energized when two or more keys are depressed simultaneously. The same signal used to energize the error indicator may also inhibit any additional input data into the CRU.

When the registers receiving the data are filled, memory full indicator 58 is energized. Transmit button 59 may be depressed which enables the unit to respond when receiving the appropriate address signal. To clear the data recorded in the CRU prior to reception of the "read" command function, manual clear button 60 may be depressed.

Figure 8:
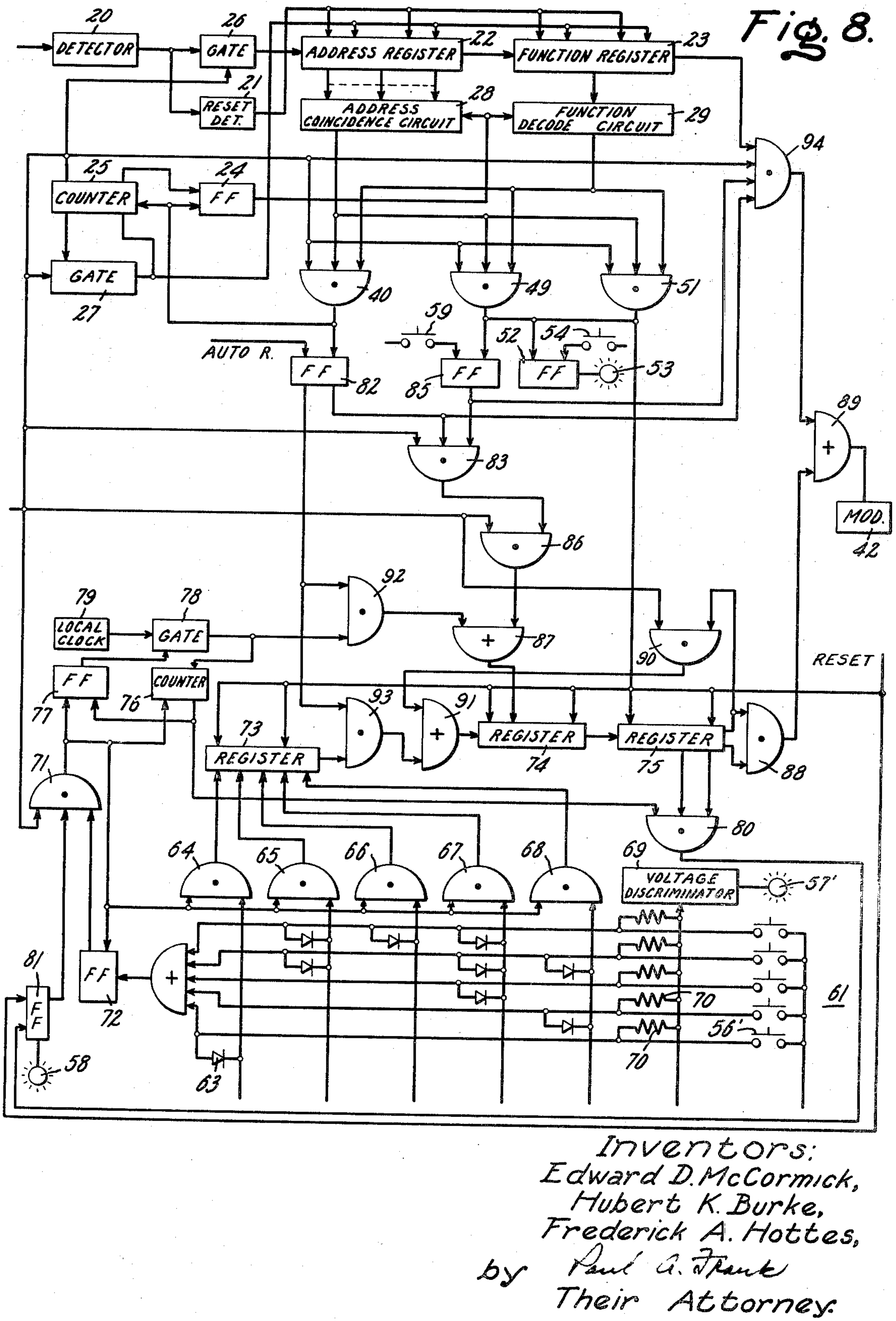
FIG. 8 is a schematic diagram of the second embodiment of the communication response unit used in cooperation with the keyboard device.

FIG. 8 illustrates another embodiment of our invention wherein the keyboard 55 of FIG. 7 is utilized as the message input to the communication response device. For brevity, only five keys 56 and a typical encoding diode matrix 61 are shown. Each key 56 when depressed generates a different bit pattern composed of five bits which may, for example, represent in digital form the numeral inscribed on the keys 56. Using the depression of key 56', for example, a completed circuit is established. A voltage level is created through an external source (not shown) which may represent, for example, binary logic one. The signal thus generated travels to OR gate 62 and through diode 63 into AND gate 64. The other AND gates 65 through 68 not receiving a signal directly from diode matrix 61 do not generate an output. This may represent binary logic zero. The depression of key 56', therefore generates a particular bit pattern.

Voltage discriminator 69 and summing resistors 70 allow the detection of a simultaneous depression of two or more keys by energizing error indicator 57. Data input may also be inhibited by an inhibiting output to AND gate 71.

Delay flip-flop 72 is utilized to ensure that all contact bounce has ceased before opening any of AND gates 64 through 68. This is necessary due to the exact timing required in operating the high speed electronic circuits of the response unit. Thus, when one of the keys 56 is depressed, the generated signal enters OR gate 62 which places delay flip-flop 72 in the set position. The output of delay flip-flop goes to AND gate 71 which controls the input to AND gates 64 through 68 and resets delay flip-flop 72. The keyboard 56 may be designed, when desired, to permit one output per depression of a key 56'.

The following cycle of operation takes place when entering data into data storage registers 74 and 75. The signal generated by keys 56 enters AND gate 71 via delay flip-flop 72. During the same interval a clock pulse also enters AND gate 71. The output of AND gate 71 enters into AND gates 64 through 68 which individually produce an output when a signal from diode matrix 61 is also present. It is important to note, however, that AND gates 65 through 68 are open for only one clock pulse because delay flip-flop 72 is reset in the same interval, thus closing AND gate 71.

The output, if any, from AND gates 64 through 68 is stored in parallel-in, serial-out five bit register 73. When AND gates 64 through 68 are individually open and generating an output, register 73 stores a binary one; otherwise, a binary zero is stored.

AND gate 71 also resets divide-by-five counter 76 and flip-flop 77 which opens gate 78 allowing five clock pulses of local clock generator 79 to serially shift the information stored in storage register 73 to forty-bit storage register 74. At the fifth clock pulse, divide-by-five counter 76 changes state and places flip-flop 77 in the set position. Gate 78 then is closed, stopping the internal clock pulses from local clock generator 79 from entering the circuit.

The above cycle is repeated each time a key is depressed. The cycles continue until registers 74 and 75 are filled. The messages are predetermined to contain a binary one in the most significant position. When register 75 is filled, it generates a signal which is utilized with the signal output of counter 76 to open AND gate 80 which places flip-flop 81 is the set position. The signal output of flip-flop 81 in the set position operates the memory full indicator 58 and produces an inhibiting signal which keeps AND gate 71 closed, thus electronically disabling keyboard 55 from entering any more data into storage register 73.

To transmit the data back to the central station, the following operation takes place. As previously discussed AND gate 40 produces an output only when there is address coincidence and a "read" command function. The output then enters into auto-reset flip-flop 82 which provides one input into three-input AND gate 83. The other inputs are received from flip-flop 85 and divide-by-twenty-five counter 25. Counter 25 allows open AND gate 83 to open only after the first twenty-five address and function pulses have entered the unit. Flip-flop 85 is placed in the set position by transmit button 59 (also seen in FIG. 7). AND gate 83 in conjunction with clock pulses opens AND gate 86. The clock pulses of AND gate 86 enters OR gate 87 which in turn allows the clock pulses to shift the stored data out of registers 74 and 75. The data goes through AND gate 88 and OR gate 89 to modulator 42 for transmission back to the central station.

The data shifted out of registers 74 and 75 is also shifted back in the registers via AND gate 90 and OR gate 91. This is necessary to reserve the data because there may be instances when the central station requires a re-transmission of the message.

Auto-reset flip-flop 82 also provides double protection against the accidental entry of more data from keyboard 55 while there is transmission. As seen in FIG. 8, unless flip-flop 82 is in the reset position, no clock pulses from local clock generator 79 may go through AND gate 92 and also no information may be shifted through AND gate 93 to resistors 74 and 75.

Shifting of the address and function information to modulator 42 is controlled by AND gate 94 which is opened by simultaneous input signals from registers 22 and 23, counter 25, auto-reset flip-flop 82, and flip-flop 85. Thus, transmission results only after address coincidence has occurred and a "read" function has been decoded.

The clear function which opens AND gate 49 operates to clear registers 74 and 75 and also resets flip-flop 85. The error signal opens AND gate 47 and simularly clears the registers 74 and 75 and reset flip-flop 85. The error signal as before energizes error indicator 53 by placing 52 in the set position which must be reset manually through switch 54.

As is seen from the preceding description and the following operative summary, it is evident that our invention attains the objectives set forth and makes available a novel communication response unit device which has extreme flexibility.

In operation, the communication response unit device of our present invention is provide with a signal detector for receiving a modulated electromagnetic signal carrying a preliminary reset pulse and coded address and function command information. There address and function storage registers are initially placed in a normal state by the preliminary reset pulse, thereby reducing possible interference by electronic disturbances. The described address coincident circuit responds only to the address information in the address register which is arranged in a singular pattern. When there is address coincidence, the response unit device operates in one of a number of modes dictated by the command function information stored in the function register and decoded by the described function decoder. When the command function is "read," corresponding to a first mode, the device of our present invention responds by shifting recorded reply data out of a reply data shift register and moving it to a modulator for transmission along with the address of the response unit device. When there is no recorded reply data, the clock pulses move an "idle" message now comprising the replay data out of the replay data shift register along with the address of the response unit device to the modulator. The device operates in a second mode when the command function is "clear" wherein the recorded data is removed or cleared and the date shift register is placed in a normal state, thus indicating to an operator that the data has been received. An error indicator is additionally energized in a third mode when the command function "error" is transmitted which clears the CRU of recorded data and notifies the operator of an error in transmission of recorded data.

Having described several features and embodiments of a novel communication response unit device, it is considered that modifications and variations are obviously possible in view of the above teachings. Thus, the simple positive-negative response switch and keyboard device are but two ways that data may be entered into the storage registers of the response unit device of our present invention. The number of operating modes in which the response unit device operates may also be increased as desired. The address and function registers may be increased to accommodate large numbers of addresses and more complex function codes. It is, therefore, to be understood that changes may be made in the particular embodiments of our invention described which are within the full intended scope of the invention as defined by the following claims.

What we claim as new and desire to secure by Letters Patent of the United States is:

1. A communication device comprising
signal detecting means for receiving an electromagnetic signal modulated by a preliminary reset pulse and coded information;
first shift register means set in a normal state by the reset pulse for storing an address portion of the coded information;
reply data storage means for storing reply data;
address decode means including a coincident detector responsive to a predetermined singular pattern of coded information for providing a signal output only when the address portion of the coded information stored in said first shift register is arranged in said predetermined singular pattern; and
means for removing reply data from said reply data storage means in response to a signal output of said address decode means.

2. The device of claim 1 including
second shift register means set in a normal state by said reset pulse for storing a function portion of the coded information carried by the modulated signal,
second decode means including a function decoder responsive to a plurality of predetermined patterns of coded information for controlling operation of said removing means when the function portion of the coded information is arranged in one of a plurality of predetermined patterns.

3. The device of claim 2 wherein said removing means removes the reply data to a modulator for transmission when the function portion of the coded information is in a first predetermined pattern.

4. The device of claim 3 including means for shifting the address portion of the coded information to said modulator for transmission.

5. The device of claim 3 wherein said removing means operates to place said data receiving means in a normal state when the function portion of the coded information is in a second predetermined pattern.

6. The device of claim 5 including an error indicator energized by said removing means when the function portion of the coded information is in a third predetermined pattern and wherein said shifting means operates to place said reply data means in a normal state.

7. A communication device comprising
signal detecting means for receiving an electromagnetic signal modulated by coded information;
first means responsive only to a first portion of said coded information arranged in a predetermined singular pattern for producing a first signal output;
second means responsive only to a second portion of said coded information arranged in one of a plurality of predetermined patterns for producing a separate signal output corresponding to each of said plurality of predetermined patterns;
reply data storage means for storing reply data;
a modulator;
an error indicator; and
removing means responsive to the first signal output of said first means and to each of the separate signal outputs of siad second means operable in a plurality of modes, each of said modes determined by one of the separate signal outputs, said modes including
a first mode in which said removing means removes said reply data from said reply data storage means to said modulator for transmission;
a second mode in which said removing means places said reply data storage means in a normal state; and
a third mode in which said removing means places said reply data storage means in a normal state and energizes said error indicator.

8. The device of claim 7 wherein said signal detecting means is adapted to receive an electromagnetic signal modulated by coded information in the form of a preliminary reset pulse and a code and clock signal, said device also including address and function storage registers which are set in a normal state by the reset pulse and which store the first and second portions of the coded information.

9. The device of claim 8 including manual switch means for selectively providing the reply data in the form of one of a plurality of differently coded signals and wherein said reply data storage means stores the selected coded signal.

10. The device of claim 8 including a means for coding data and means for moving the coded data into said data storage means and wherein said reply data storage means further includes a data storage register.

11. The device of claim 10 wherein said moving means includes an internal clock pulse generator.

12. The device of claim 11 including a memory full indicator and wherein said data storage register actuates said memory full indicator when said data storage register is filled.

13. The device of claim 12 wherein said removing means includes a switching means, said switching means in a closed position blocking the entrance of the clock signal into said data storage register and in an open position allowing passage of the clock signal into said data storage register which moves the reply data out of said data storage register.

References Cited

UNITED STATES PATENTS

| | | | |
|---|---|---|---|
| 3,341,845 | 9/1967 | Deman | 343—6.5 |
| 3,341,846 | 9/1967 | McMurren et al. | 343—6.8 |
| 3,384,891 | 5/1968 | Anderson | 343—6.5 |
| 3,440,651 | 4/1969 | Fluhr et al. | 343—6.5 |

RICHARD A. FARLEY, Primary Examiner

M. F. HUBLER, Assistant Examiner

U.S. Cl. X.R.

343—6.5, 6.8